United States Patent

[11] 3,617,863

| [72] | Inventor | David A. Espen<br>Phoenix, Ariz. |
|---|---|---|
| [21] | Appl. No. | 25,004 |
| [22] | Filed | Apr. 2, 1970 |
| [45] | Patented | Nov. 2, 1971 |
| [73] | Assignee | Sperry Rand Corporation |

[54] CONSTANT AMPLITUDE-VARIABLE PHASE CIRCUIT
9 Claims, 1 Drawing Fig.

[52] U.S. Cl. .................................................... 323/109,
323/122, 324/86, 340/198
[51] Int. Cl. ....................................................... G05f, G01r
25/10
[50] Field of Search .......................................... 323/103,
108, 109, 122; 318/690, 691; 340/198; 321/57;
324/86

[56] References Cited
UNITED STATES PATENTS

| 2,627,598 | 2/1953 | Browder et al. ............... | 323/109 |
| 3,179,877 | 4/1965 | Godet........................... | 323/109 X |
| 3,401,330 | 9/1968 | Offereins...................... | 323/109 |

*Primary Examiner* — William H. Beha, Jr.
*Attorney* — S. C. Yeaton

ABSTRACT: An electronic circuit including an operational amplifier having a differential input stage coupled to passive linear input and feedback circuit components for converting three wire synchro-type data to an equivalent constant amplitude-variable phase signal.

PATENTED NOV 2 1971
3,617,863
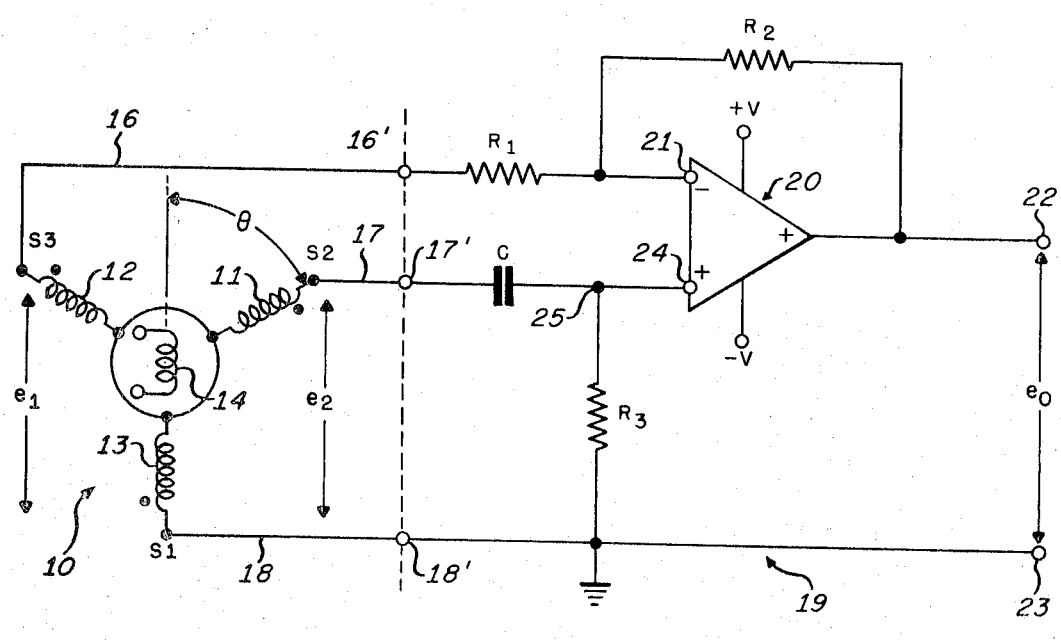
INVENTOR
DAVID A. ESPEN
BY
*HP Ferry*
ATTORNEY 3,617,863

CONSTANT AMPLITUDE-VARIABLE PHASE CIRCUIT

BACKGROUND OF THE INVENTION

1. Field of the Invention

The present invention relates to electronic circuits for converting three wire synchro-type analog signals to an equivalent analog signal of constant amplitude and variable phase angle, where the latter is directly proportional to and representative of the angle or other information conveyed by the three wire signals. The circuit therefore has general utility as a phase converter but will be described herein particularly with reference to synchros for converting mechanical shaft angle to electrical phase angle and further in conjunction with flux valves for magnetic field gradient sensing purposes.

A circuit which converts angle information obtained from a synchro or flux valve to a constant amplitude-variable phase signal eliminates certain errors that are likely to occur in these devices. As is well understood by those skilled in the art, the accuracy of synchro or flux valve data, represented by the amplitude of a resultant vector corresponding to the three wire signals, can be degraded by changes in the amplitude of the electrical excitation supplied to the angle sensing device. For instance, in the case of a synchro which is coupled to a control transformer having a fixed rotor, the amplitude of the signal produced therein as representative of the synchro angle also depends on variations in the amplitude of the excitation applied to the synchro rotor. In the case of a flux valve, even where provision is made to preclude such errors, as by coupling the flux valve to a rotor-slaved control transformer of a magnetic compass system, amplitude errors can still occur, irrespective of the constancy of the applied excitation, as a result of changes in the magnetic field intensity. It will be appreciated that a system of this type which is designed for proper operation at latitudes where the horizontal component of the Earth's magnetic field intensity is relatively strong and constant will tend to become sluggish and inaccurate at higher latitudes where the horizontal Earth's field intensity component diminishes unless compensation is made therefor. By the use of the present invention the need for such compensation is obviated inasmuch as the angle information is represented by phase rather than amplitude.

2. Description of the Prior Art

Various electrical and mechanical devices have been developed in the prior art to perform the function of the circuit disclosed herein. A rather simple electrical circuit device which was developed several years ago is exemplified by U.S. Pat. No. 3,211,993 issued to H. W. Golden, et al. This patent describes a passive linear circuit adapted for coupling to the three wire stator output of a synchro. The circuit is characterized by a two wire ground isolated output having high impedance, as a consequence of which it is sensitive to load variations.

SUMMARY OF THE INVENTION

The present invention overcomes the aforementioned limitations of the prior art device by the provision of an electronic circuit incorporating an operational amplifier which furnishes a low impedance single wire output referenced either to ground or a point common with one of its inputs. The three wire input signals are coupled through appropriate resistive and reactive circuit components to a differential input stage of the amplifier, the components being selected and arranged such that the transfer function of the circuit corresponds to the general transfer characteristic of a constant amplitude-variable phase circuit.

BRIEF DESCRIPTION OF THE DRAWING

The sole FIGURE is a schematic illustration of the inventive circuit shown coupled to a synchro transmitter.

DESCRIPTION OF THE PREFERRED EMBODIMENT

Referring to the FIGURE, synchro transmitter 10 including equiangularly displaced stator windings 11, 12 and 13, which derive their excitation from rotor 14 connected to an alternating current source (not shown) are coupled respectively by leads 16, 17 and 18 to input terminals 16', 17' and 18' of constant amplitude-variable phase circuit 19 comprising operational amplifier 20 which has a differential amplifier input stage. Circuit 19 has a transfer function of the form $$e_0 = -\frac{R_2}{R_1}e_1 + \left(\frac{R_2}{R_1}+1\right)\left(\frac{1}{1-J\frac{1}{wCR_3}}\right)e_2 \quad (1)$$

where $R_1$ is a resistance connected between circuit input terminal 16' and the amplifier inverting input terminal 21; $R_2$ is a resistance connected between input terminal 21 and output terminal 22 whereat the constant amplitude-variable phase signal is produced from the low output impedance of the amplifier with reference to common terminal 23 coupled to input terminal 18'; $R_3$ is a resistance connected between circuit terminal 18' and amplifier noninverting input terminal 24; and C is a capacitor connected between circuit terminal 17' and the amplifier noninverting input terminal.

It will be apparent to those skilled in the art that the transfer function of equation (1) could also be obtained with the feedback resistor $R_2$ coupled back to the noninverting input terminal in conjunction with other combinations of resistive and reactive components; for example, with each of the indicated components replaced by respective impedances including appropriate series and parallel connections of various elements. The indicated circuit configuration is preferred, however, because of the simplicity which it offers by virtue of requiring only four passive components coupled to the operational amplifier.

In accordance with conventional practice the voltages induced by rotor 14 in the three synchro stator windings reference to their common center point may be represented mathematically as follows:

$V_{S2} = E \cos \theta \sin wt \quad (2a)$
$V_{S3} = E \cos (\theta-120) \sin wt \quad (2b)$
$V_{S1} = E \cos (\theta-240) \sin wt \quad (2c)$ where $w$ is the angular frequency in radians per second of the carrier frequency excitation applied to the synchro rotor; E is the maximum value of the voltage induced in the stator windings by rotor 14; and $\theta$ is the counterclockwise angular displacement of the rotor relative to stator winding 11, the free ends of the stator windings having the same instantaneous carrier frequency phase as indicated by the dot adjacent each winding. The voltages $e_1$ and $e_2$ can be determined from equations (2a), (2b) and (2c) as $e_1 = V_{S3S1} = E[\cos(\theta-120) - \cos(\theta-240)] \sin wt$
$\quad = \sqrt{3} E \sin \theta \sin wt \quad (3a)$ and $e_2 = V_{S2S1} = E[\cos \theta - \cos(\theta-240)] \sin wt$
$\quad = E/2\sqrt{3} \sin \theta + 3 \cos \theta] \sin wt$
$\quad = \sqrt{3} E \sin (\theta+60) \sin wt \quad (3b)$ If the voltages $e_1$ and $e_2$ are suitably combined, a constant amplitude-variable phase characteristic will result. For example, consider the following equation (4).

$e_0 = -K/2 e_1 + K/1 - J\sqrt{3} e_2 \quad (4)$

Substitution of equations (3a) and (3b) into equation (4) and appropriate manipulation thereof yields $e_0 = -3E/2 \cos(wt - \theta + 30) \quad (5)$ From equation (5) it is seen that the voltage has the desired constant amplitude ($3E/2$) and variable phase ($wt + 30 - \theta$) in that the carrier frequency $w$ is phase shifted by a variable amount $\theta$ corresponding to the angle data input derived from the synchro, that is, the output is a constant magnitude sinusoidal signal of the same frequency as the synchro excitation but is variably shifted in phase relative thereto in direct proportion to the angular displacement between the synchro rotor and stator. As indicated by the equation, the output signal phase leads the applied synchro carrier frequency excitation by 30°. This can easily be compensated for, if required, by any of several well known techniques, for example, by introducing a corresponding fixed phase shift into the reference excitation.

Equation (1), representing the transfer function of circuit 19, can be made to conform to the transfer characteristic (equation 4) of a constant amplitude-variable phase circuit by appropriate selection of resistances $R_1$, $R_2$ and $R_3$ and the capacitive reactance $X_C$ corresponding to capacitor C. Thus, by making $R_1=R_2$ and $wCR_3=1\sqrt{3}$ or $X_C=\sqrt{3}\ R_3$ equation (1) becomes $$e_0 = -e_1 2/1 - J\sqrt{3} + e_2 \quad (1')$$

which is equivalent to equation (4) where K equals 2.

Inasmuch as the reactance is the only frequency sensitive component of the circuit, assuming an appropriate operational amplifier having a wideband flat frequency response characteristic is utilized, the circuit can be conveniently adapted for operation at various frequencies, for instance 60, 400 or 800 cycles, as required simply by changing the value of the capacitance to provide the necessary reactance value relative to resistance $R_3$ at the operating frequency. The absolute values of the components is not critical, however, and it should be understood that the previously stated relationship between the various resistances and the capacitance is not unique. Any combination of values of $R_1$, $R_2$, $R_3$, $w$, and $C$ which make equation (1) agree with equation (4) will provide the constant amplitude-variable phase characteristic.

It should also be noted that the voltage applied across the input terminals of the operational amplifier can be limited to preclude damage to the amplifier components, if necessary, simply by incorporating an additional resistor in series between capacitor C and junction point 25 coupled to the noninverting input terminal 24. If this is done though, the ratio of resistors $R_1$ and $R_2$ must be revised accordingly to maintain the desired functional capability of the circuit.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An electrical circuit for converting three wire synchro-type input data to an equivalent constant amplitude-variable phase signal, comprising
    three input terminals adapted for respective connection to the three wire inputs,
    amplifier means including a differential amplifier input stage having a pair of inputs and an output at which the constant amplitude-variable phase signal is produced,
    first impedance means connected between one of said three input terminals and one of said differential inputs,
    second impedance means connected between a second of said three input terminals and the other of said differential inputs,
    third impedance means connected between said output and a differential input, and
    fourth impedance means connected between a third of said three input terminals and a differential input.

2. The apparatus of claim 1 wherein said first, second and third impedance means are respective first, second and third resistances and said fourth impedance means is a reactance.

3. The apparatus of claim 2 wherein said third resistance is connected between said output and said one differential input and said reactance is connected between said third input terminal and said other differential input.

4. The apparatus of claim 3 wherein said first resistance has a value substantially equal to that of said third resistance and said reactance has a value substantially 3 times that of said second resistance.

5. The apparatus of claim 4 wherein said amplifier means is an operational amplifier.

6. The apparatus of claim 5 wherein said reactance is provided by a capacitor.

7. The apparatus of claim 6 wherein said one and said other differential inputs are inverting and noninverting respectively relative to said output terminal.

8. An electrical circuit for converting three wire synchro-type input data to an equivalent constant amplitude-variable phase signal, comprising
    three input terminals adapted for respective connection to the three wire inputs,
    an operational amplifier having an output terminal at which the constant amplitude-variable phase signal is produced,
    first and second impedances connected respectively between two of said three input terminals and the input of said operational amplifier,
    a third impedance connected across the input and output terminals of said operational amplifier, and
    a fourth impedance connected between the third of said three input terminals and the input of said operational amplifier,
    the respective impedance components of all said impedances being so arranged and constructed as to provide a voltage transfer characteristic between said input terminals and said output terminal such that the constant amplitude-variable phase signal $e_0 = -K/2\ e_1 + K/1-J\ 3\ e_2$ where K is a constant, $e_1$ represents the voltage applied across a first pair of said input terminals and $e_2$ represents the voltage applied across a second pair of said input terminals, one of the terminals of said first pair being common with a terminal of said second pair.

9. The apparatus of claim 8 wherein said operational amplifier has a differential input stage, said first and third impedances are connected to one differential input, and said second and fourth impedances are connected to the other differential input.

* * * * *